Jan. 1, 1952  J. S. PESTEL  2,580,952
SOUND FILM RECORDING OR REPRODUCING DEVICE
Filed Dec. 29, 1948  4 Sheets-Sheet 1
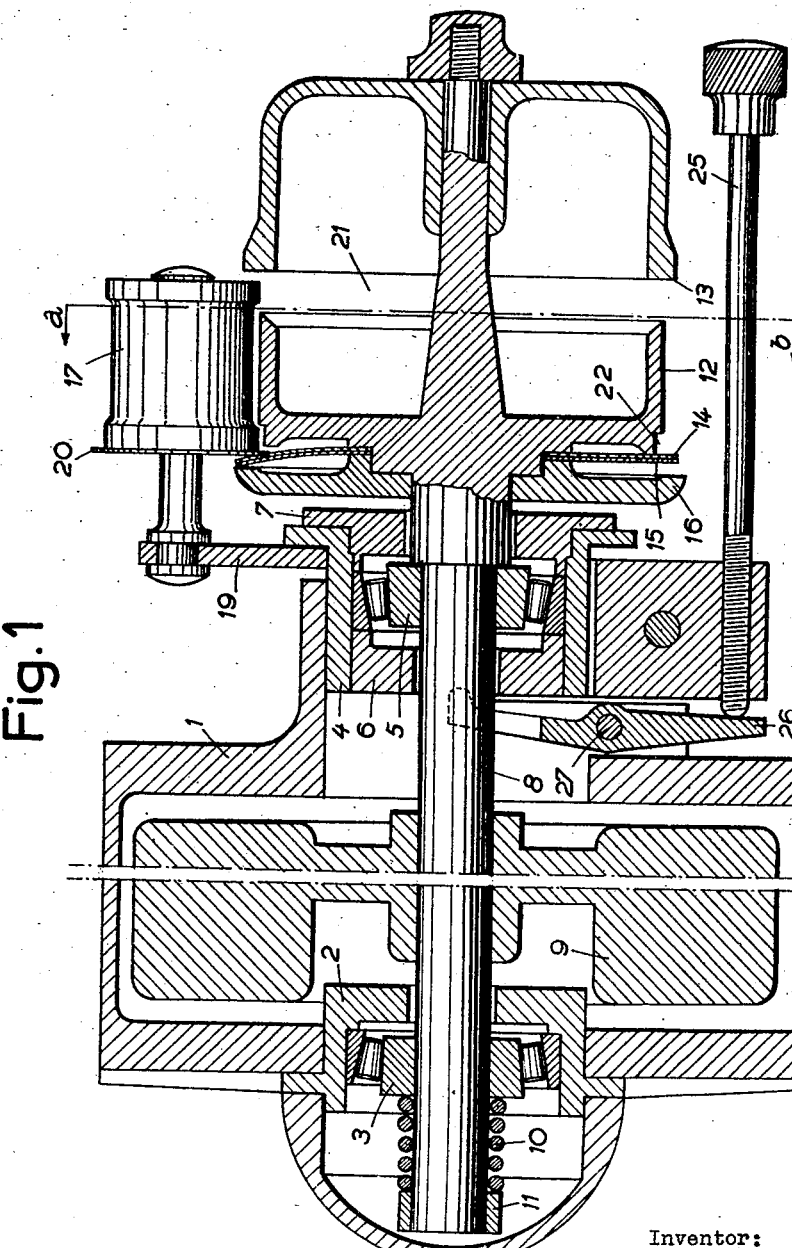
Inventor:
JULIETTE SOUCY PESTEL
By: [signature]
Attorney Jan. 1, 1952

J. S. PESTEL 2,580,952

SOUND FILM RECORDING OR REPRODUCING DEVICE

Filed Dec. 29, 1948

Inventor:
JULIETTE SOUCY PESTEL

By: *C Creased Houston*

Attorney

Jan. 1, 1952  J. S. PESTEL  2,580,952
SOUND FILM RECORDING OR REPRODUCING DEVICE
Filed Dec. 29, 1948  4 Sheets-Sheet 3
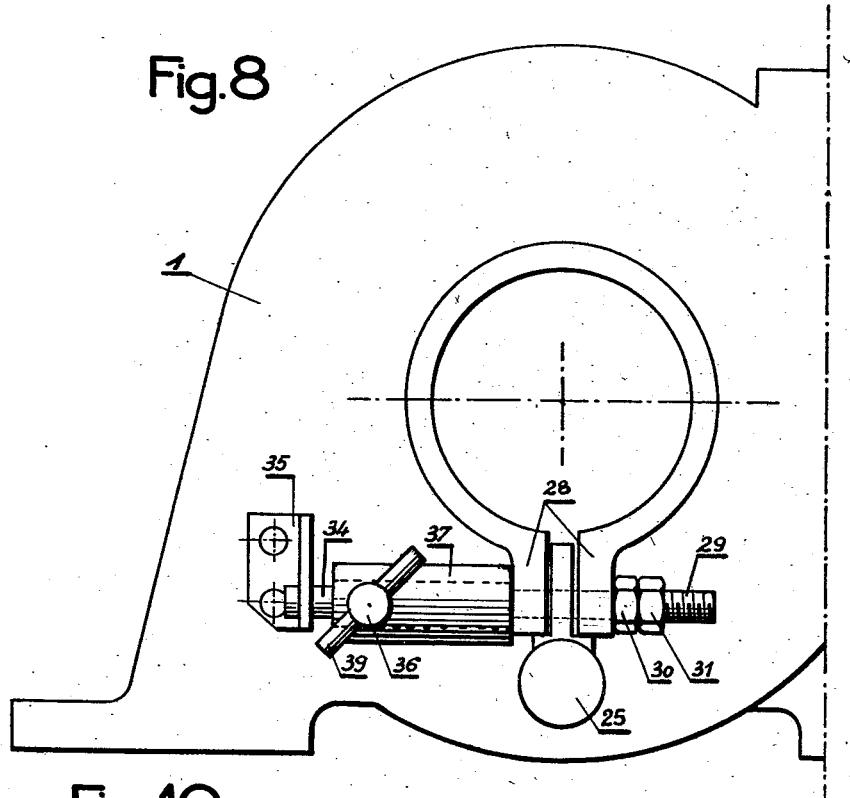
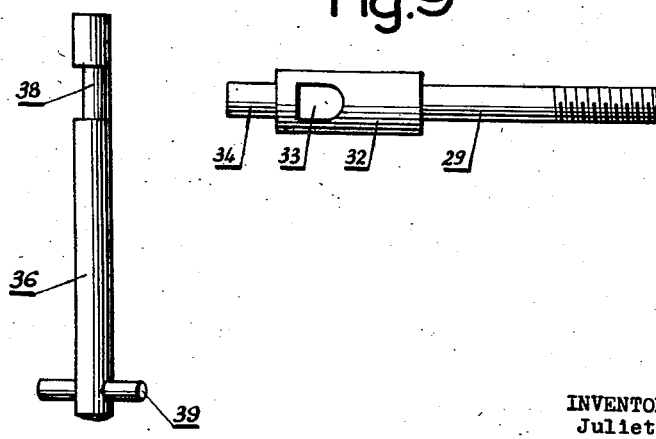
INVENTOR:
Juliette Soucy Pestel.
by: Attorney.

Jan. 1, 1952        J. S. PESTEL        2,580,952

SOUND FILM RECORDING OR REPRODUCING DEVICE

Filed Dec. 29, 1948        4 Sheets-Sheet 4

INVENTOR:
Juliette Soucy Pestel.
by: *[signature]*
Attorney.

Patented Jan. 1, 1952

2,580,952

UNITED STATES PATENT OFFICE 2,580,952

SOUND FILM RECORDING OR REPRODUCING DEVICE

Juliette Soucy Pestel, Soissons, France

Application December 29, 1948, Serial No. 68,029
In France January 19, 1948

16 Claims. (Cl. 179—100.3)

The present invention relates to improvements in sound film recording or reproducing devices.

Faithful reproduction of sound in sound reproducing apparatus utilising films as for example cinematograph projection apparatus requires the passage of the film in front of the photoelectric cell to be effected with a uniform speed of movement.

This condition is not always realised in known apparatus despite the provision of a fly wheel on the drum over which the film passes during its passage before the otpical system. Parasitical accelerations of the film result which are generally shown by distortion or quivering.

These defects generally come from the lack of adhesion between the film and the drum and consequently between the film and the fly wheel.

The present invention avoids this difficulty by making the film solid with its regulator fly wheel during the passage of the said film between the light source and the photo-electric cell.

This solid connection is obtained by making the film pass over a hollow drum solid with the regulator fly wheel, the film being clamped between the two cheeks of the drum, one cheek being formed by a rigid ring formed in one with or carried by the drum, the other part being formed by a resilient disc pressed against the section of the film by a series of springs.

The film is led onto the drum by a rotary roller which feeds the film against the drum. This roller carries a rigid disc of small thickness which spreads out the flexible disc carried by the drum in such manner as to permit the engagement of the film on the drum before its passage in front of the photo-electric cell and its disengagement after passage in front of this cell.

The invention also comprises a special device permitting regulation of the sound track of the film relatively to the light emited by the optical system and received by the photo-electric cell.

In this device the assembly of the optical system and of the photo-electric cell is fixed and regulation is obtained by the axial displacement of the film drum, of its spindle, of the regulator fly wheel and the feed roller.

This displacement is effected by a micrometer screw acting on the extremity of a lever, the other end of which is forked and acts on the cage of one of the bearings of the drum spindle, this cage being mounted with a sliding fit in a sleeve rigid with the frame of the apparatus.

The assembly consisting of the drum, roller, fly-wheel and spindle is subjected to a coil spring placed between a ring carried by the spindle and the internal ring of a second bearing having a friction fit.

The coil spring also has for its action to take up automatically any possible play in the bearings.

The regulation of the sound track being obtained, the regulating device is locked by means of a collar clamping the cage of the first bearing, the said collar being clamped by means of a cam key.

The present invention finally has for its object the construction of the drum of a material transparent to light so as to avoid the apertures which opaque drums must necessarily possess.

The shape of the transparent drums may be as desired and appropriate to the sound reproducing or recording device on which the drum is to be mounted. They comprise one or more grooves opposite the sound track or tracks of of the film the said grooves having for their object to ensure that the friction of the film does not in time cause deterioration of the polish and consequently the transparency of the drum at the points of the sound track or tracks.

The construction of the drum of transparent material permits the light source or the photoelectric cell to be placed at a point which is not necessarily directly opposite the sound track. This result is obtained by giving the drum opposite the sound track the form of a prism for deviating the light rays.

Other characteristics of this invention will be apparent from the constructive example to be described below and which shows in conjunction with the attached drawings how the invention may be carried out.

In the accompanying drawings:

Fig. 1 is an axial longitudinal section of the assembly of a sound reproducer,

Figure 7:
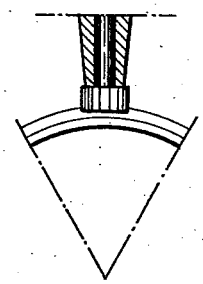
Figures 5, 6:
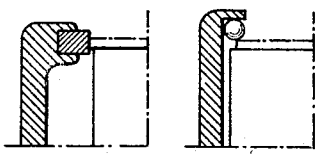
Figure 11:
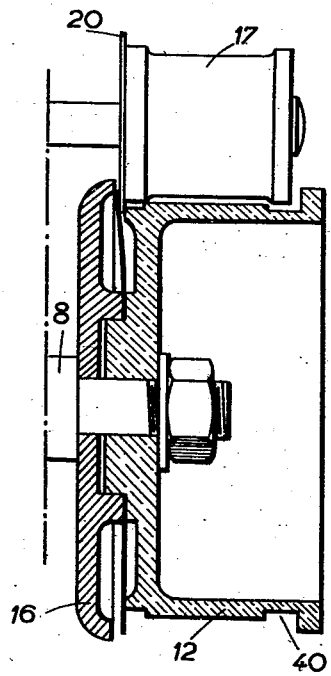
Figure 12:
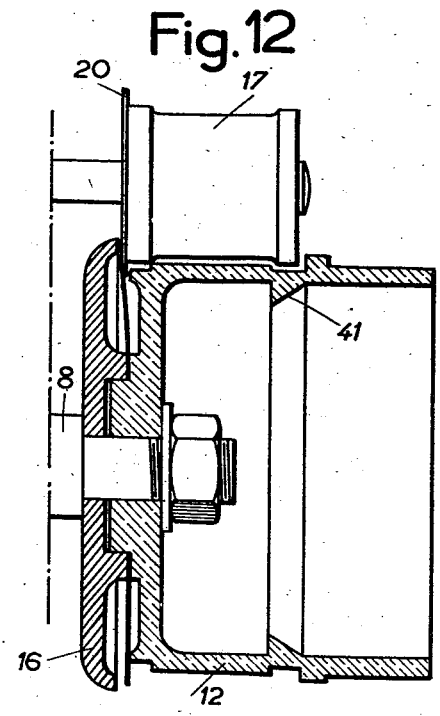

Fig. 5 is a section showing a first modification of the construction of the resilient disc, Fig. 6 is a section showing a second embodiment of the film clamping means, Fig. 7 is a view showing a variation of the device permitting the flexible discs to be spread, Fig. 8 is an elevation showing the assembly seen from the side of the drum the latter as well as the spindle being removed, Fig. 9 shows the element for effecting the clamping of the locking collar, Fig. 10 shows the locking key, Fig. 11 is a vertical section of a transparent drum, Fig. 12 is a vertical section of a transparent drum permitting deviation of the light emitted by the light source.

These figures are only given by way of example and the constructions shown on the drawings are not intended to limit the invention which further comprises possible variations and modifications within the scope of the appended claims.

Referring to Fig. 1 it will be seen that the reproducing device comprises a member 1, forming a casing. The left hand flange of this casing carries a fixed cage 2 containing a bearing 3 with conical rollers, the right hand flange is accurately bored and contains a movable cage 4 containing a bearing 5 with conical rollers which is enclosed by means of elements 6 and 7. The bearings 3 and 5 serve to support the shaft 8 carrying the fly-wheel 9. The interior ring of the bearing 3 has an easy sliding mounting on the shaft 8 and this ring is subjected to the action of a coil spring 10 bearing against a collar 11 rigid with the shaft 8. It will be seen that this arrangement automatically takes up the play which may occur in use in the bearings 3 and 5.

The right hand end of the shaft 8 carries a drum over which the film passes. This drum embodies an element 12 acting like a pulley over which the film is drawn and two elements 13 and 14 forming the checks of the pulley and between which the film is clamped. The element 13 forming one of the cheeks of the drum is an element revolution having the form of a cup so as to provide a hollow space in which the fixed photoelectric cell is located (shown diagrammatically at C on Fig. 2).

Figure 3:
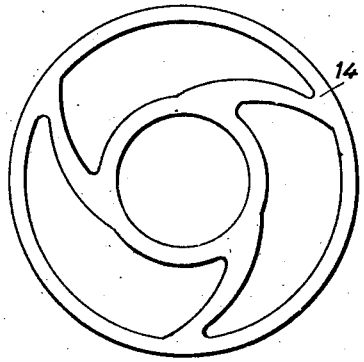
Fig. 3 shows the flexible disc of the film drum.

The element 14 forming the other cheek of the drum is composed of a disc of thin metal sheet of which the flexibility has been further increased by providing incisions therein of the form shown in Fig. 3 for example.

Figure 4:
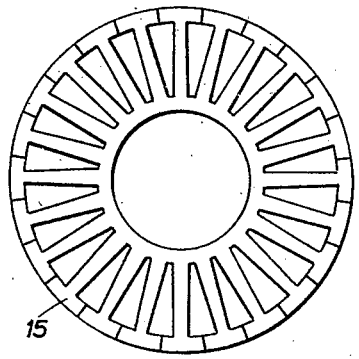
Fig. 4 shows the disc comprising the pressure springs.

To the rear of the element 14 is a second disc 15 composed of a steel sheet cut to the shape shown on Fig. 4, for example, in such a way as to provide a series of blade springs. The discs 14 and 15 are fixed to the drum 12 by means of the element 16 which screws onto the drum.

These various parts from which the pulley is formed comprise one rigid cheek and one resilient cheek. The distance between the two cheeks is selected so that it is slightly less than the width of the film.

It should be noted that the part 16 forming a nut comprises an annular collar of the same diameter as the flexible discs and that this part besides its clamping function serves to prevent the flexible discs from moving beyond their elasticity limit.

The film is fed onto the pulley 12 by means of the roller 17 which turns around the spindle 18 secured to the part 19 solid with the cage 4.

The roller 17 is provided with a flange 20 which by its action on the discs 14 and 15 causes them to separate so as to permit the free passage of the film.

It should be noted that the drum 12 and the cheek 13 do not touch one another and a gap 21 is provided through which the light rays are emitted by the optical device O and received by the photo-electric cell C, this latter being fixed within the rotary drum by an arm also passing through the gap 21.

The sound track of the film placed on the drum 12 comes opposite the gap 21 and modulates the light rays received by the cell in the course of its passage past the optical system.

The drum 12 is provided with a groove 22 in which the roughness which may be comprised by the perforated part of the film is located.

Figure 2:
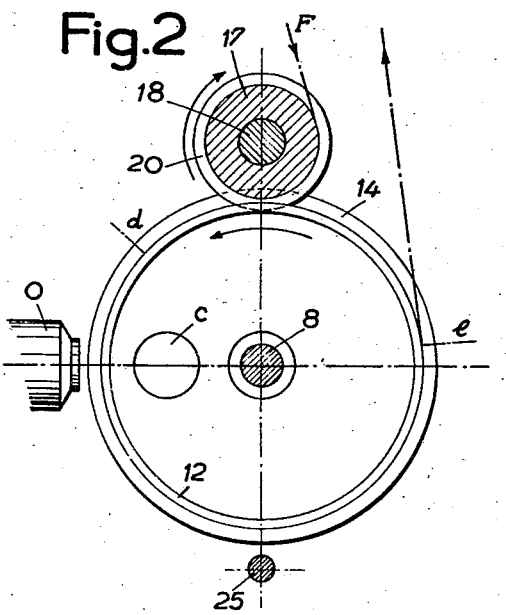
Fig. 2 is a sectional view on the plane a—b Fig. 1.

For clearness the film has not been shown on Fig. 1 but it is shown in chain dot lines at F on Fig. 2.

The operation of this sound reproducing device is as follows:

The film after having passed through the image projecting device properly speaking is looped so as to avoid the transmission to the reproducing device of all intermittent movement and reaches the point F Fig. 2, and passes below the roller 17 which places it against the drum 12. This operation is only possible by the action of the flange 20 of the roller 17. In effect, as specified above, the width of the drum 12 is slightly less than the width of the film and without the action of the flange 20, which by its rotation separates the flexible discs 14 and 15 the application of the film against the drum 12 would be impossible.

The film thus travels around the drum 12 and passes in front of the optical system O positioned opposite the gap 21, it continues its movement and is disengaged automatically from the drum 12 when it comes into the zone of influence of the flange 20 of the roller 17.

It will be seen that in this apparatus the film is made solid with the regulator drum over a distance equal to that situated between the points a and b Fig. 2 by the action of the discs 14 and 15 clamping the film over these sections.

The pressure exerted by the flexible discs 14 and 15 may be relatively high without any risk of flexing the film in the direction of its width by the fact that the said pressure is exerted on the film while the latter is passing around an arc of a circle.

Experience has shown that with the device described it is possible to draw on the film with a force of 5 kgms. without producing slipping of the film on the regulator drum. This force of 5 kgms. is much higher than the parasitical forces acting on the film and tending to disturb reproduction from the sound track.

It is obvious that according to the special construction of each type of projection apparatus various modifications may be made in the apparatus described and that it will often be necessary to provide a second roller also provided with a flange for liberating the film from the drum at any part of the drum after the passage of the film in front of the optical system but it will be important to make use of the action of the flexible discs over the greatest possible portion of the regulator drum.

The procedure of smoothing the film drive which has been described may be realised in various ways lying within the framework of the invention. Thus a drum could be provided comprising two cheeks formed of flexible discs situated on each side of the film. It is also possible to envisage, Fig. 5, providing the regulator drum with a cheek provided with an elastic material of the nature of india-rubber, leather or the like, the said material serving to clamp the piece of film. Another variation of the device is shown by Fig. 6 in which the film is shown clamped by means of an arrangement of balls acting by running on the film.

Finally a series of springs could be provided with blades distributed on the flange or flanges of the drum, the said springs overlapping in part; this latter embodiment permitting the use of an intermediate flexible disc to be avoided.

As regards the setting of the flexible discs providing the rigid connection between the film and the drum, it is possible to effect their displacement at the point where the film reaches the drum by means of one or more rollers of which the axis of rotation is situated perpendicularly to the axis of rotation of the shaft of the regulator drum as shown on Fig. 7.

All these constructive modifications have an identical purpose and result from the procedure forming the subject of the present invention.

The procedure and constructions for making the connection between the film and the drum rigid and which have been described are not limited in their application to the construction of a reproducing device for sound and the present application provides for the application of the invention to sound recording apparatus, to drawing machines and in general to all apparatus in which it is necessary or desirable to regularise the speed of a film or band of any type.

The reproduction of sound by an impressed band is often effected by a "push-pull" process in which the sound track is composed of a comparatively narrow opaque indented section situated in the middle of the part of the strip reserved for sound. This sound track by reason of inequalities of positioning between different films is not always at the same place. It is thus necessary for each strip to regulate the light spot exactly to the said sound track. This regulation may obviously be obtained in the known manner by the displacement of the optical system or of the photo-electric cell.

This procedure however offers several difficulties and the present invention further comprises an arrangement in which correct regulation is obtained not by displacing the optical system or the cell but by displacing the film and consequently the sound track itself.

Referring to Figs. 1, 8, 9 and 10 it will be seen that the displacement of the drum and consequently of the film is effected by means of a knurled screw 25 acting on the extremity of the lever 26 pivoting on spindle 27. The other extremity of the said lever is forked to act on the cage 6 in the bore of a side member 1. Contact between the forked extremities of the lever and of the cage 5 is always maintained whatever the direction of rotation of the screw 25, by the action of the spring 10.

Once regulation is obtained the device is secured by means of the clamping device shown on Figs. 8, 9 and 10. To this end the bore of the side member 1 is split in the longitudinal direction and carries two lugs 28 traversed by a hole in which is fitted the member 29 formed of a threaded rod provided with a nut 30 and lock nut 31. This element is provided with a cylindrical boss 32 in which is cut a lateral opening 33. It is terminated by a cylindrical portion 34 engaging in a bracket 35 fixed to the side member 1 and having for its purpose to guide the element 29.

The clamping device is completed by the key 36 and the tube 37. The key embodies a cylindrical rod in which is cut a flat part, or as shown in Fig. 10, provided with a cylindrical part 38 eccentric relatively to the axis of rod 36. The key comprises an operating cross piece 39 and is engaged in two apertures in the tube 37 and in the aperture 33 of the element 29. It will be readily seen that rotation of the key has for its effect to cause the lugs 28 to approach one another and consequently to secure, in the adjustment position, the assembly formed by the spindle, drum and film. Adjustment of the maximum clamping action and allowance for wear of the key or of the aperture in which it engages is possible by means of the nuts 30 and 31.

Fig. 11 shows the drum 12 formed of transparent material which may for example be of crystal or of a material of the kind known as "Plexiglas." At 40 there is a groove situated opposite the sound track of the film which groove has for its purpose to prevent damage by friction of the transparent surface. The drum 12 is fixed on the spindle 8 solid with the regulator fly-wheel. Fig. 12 shows the same arrangement with this difference that the part 41 is provided within the drum opposite the groove having a particular prismatic shape designed to deviate the rays emitted by the light source. This device permits the photo-electric cell to be placed at the point which depends on the angle made by the part 41 with the generatory axis of the drum.

It should be understood that numerous variations in the constructional features may be made in this device within the scope of the appended claims the device as a whole being characterised by the fact that the film and consequently the sound track is adjustable relatively to the optical axis.

What I claim is:

1. In sound film apparatus, means for steadying the movement of film, comprising a film drum driven by the traction of the film, a fly-wheel associated with said drum and frictional means associated with said drum acting on the film passing over the drum to provide a definite connection between the film and the drum, said frictional means comprising a rigid flange against which one edge of said film bears, and a circular series of radially outwardly disposed interconnected leaf springs forming a resilient flange for frictional contact with the other edge of said film.

2. In sound film apparatus as claimed in claim 1 which further comprises a second circular flexible member between said series of leaf springs and said edge of said film, to provide an additional frictional connection between the film and the drum.

3. In sound film apparatus according to claim 1, comprising deflector means for said resilient means at the point of entry of said film on said drum.

4. In sound film apparatus according to claim 3, in which said deflector means comprises an in-feed roller and a flange on said roller adapted to deflect said resilient means.

5. In sound film apparatus, means for steadying the movement of film, comprising a film drum driven by the traction of the film, a fly-wheel driven by said drum, a rigid flange against which one edge of the film bears, a resilient disc on said drum acting on the other edge of the film to provide a positive frictional drive between the film and drum for the part of the film passing over said drum, an in-feed roller for the film and a flange on said roller adapted to deflect said resilient disc.

6. In sound film apparatus according to claim 5 a second disc lying in facial contact with said resilient disc and having spring tongue elements at its periphery to press said resilient disc against the film edge.

7. In sound film apparatus according to claim 5 a second spring disc lying in facial contact with the resilient disc, a ring member for clamping the inner parts of said discs against the drum and a limiting flange on said member to restrict deflection of the two discs.

8. Sound film apparatus comprising, as means for controlling the movement of the film, a film traction drum, a shaft for said drum, a fly-wheel on said shaft, resilient film-gripper elements acting on one edge of the film, a film in-feed roller, means on said roller to deflect said gripper elements at the point of introduction of the film, electro-optical means for cooperation with a sound track on said film, a supporting casing, conical roller bearings in said casing for said shaft, one of said bearings being free to slide on said shaft, an abutment on said shaft and spring means acting between said latter bearing and said abutment to take up slack in the bearings.

9. Sound film apparatus comprising, as means for controlling the movement of the film, a film traction drum, a shaft for said drum, a fly-wheel on said shaft, electro-optical means for cooperation with a sound track on said film, a supporting casing, a slidable bearing mounted in said casing, a roller bearing in said mounting for the shaft, a second fixed roller bearing in said casing, said shaft being slidable relatively to said second bearing, an abutment on the end of the shaft adjacent said second bearing, a spring between the said abutment and the second bearing to take up slack in the two bearings and finely adjustable means for adjustably positioning said bearing mounting to provide adjustment of said sound track relatively to said electro-optical means.

10. Sound film apparatus comprising, as means for controlling the movement of the film, a film traction drum, a shaft for said drum, a fly-wheel on said shaft, resilient film-gripper elements acting on one edge of the film, a film in-feed roller, means on said roller to deflect said gripper elements at the point of introduction of the film, electro-optical means for cooperation with a sound track on said film, a supporting casing, a slidable bearing mounting in said casing, a bearing in said mounting for the shaft, a second fixed bearing in said casing, said second bearing being slidable relatively to the shaft, an abutment on the end of the shaft adjacent said second bearing, a spring between the said abutment and the second bearing to take up slack in the two bearings, finely adjustable means for adjustably positioning the bearing mounting to provide adjustment of said sound track relatively to said electro-optical means and clamping means for securing the mounting after adjustment.

11. Sound film apparatus according to claim 10 wherein the part of the casing enclosing the bearing mounting is split and embodies lugs contractible by the said clamp means.

12. Sound film apparatus according to claim 11 wherein the contraction of the lugs is effected by a sleeve on a spindle, the latter being traversed by a cam-like element for displacing the sleeve on the spindle.

13. Sound reproducing apparatus for a film sound track comprising, as means for controlling the movement of the film, a film traction drum, a shaft carrying said drum, a fly-wheel on said shaft, resilient film-gripper elements, a film in-feed roller, means on said roller to deflect said gripper elements at the point of introduction of the film, a light source and a photo-electric cell responsive to light from said source modulated by the sound track.

14. Sound reproducing apparatus according to claim 13 wherein the drum is formed of transparent material and has a prismatic portion on the inner side to deflect light outwardly of the drum axis.

15. Sound reproducing apparatus according to claim 13 wherein the drum is formed of transparent material and is flanked by a cup-shaped member on said shaft spaced by a physical gap from the drum and providing a part against which one edge of the film is pressed by said gripper elements, and means extending through said gap to support the photo-electric cell partly within said member and partly within the drum.

16. Sound reproducing apparatus for a film sound track comprising, as means for controlling the movement of the film, a transparent film traction drum, a recessed portion on said drum opposite the perforation lines of said film, a fly-wheel, a shaft for said fly-wheel and said drum, resilient film-gripper elements acting edgewise on the film, a film in-feed roller, means on said roller to deflect said gripper elements at the point of introduction of the film, a light source, a photo-electric cell within the drum and responsive to light from said source modulated by the sound track of the film, a supporting casing, bearings in said casing for said shaft, means to adjust said shaft to set the sound track relatively to the light source and the photo-electric cell and means for clamping said shaft after such adjustment.

JULIETTE SOUCY PESTEL.

REFERENCES CITED

The following references are of record in the file of this patent:

UNITED STATES PATENTS

| Number | Name | Date |
|---|---|---|
| 1,801,472 | Whitson | Apr. 21, 1931 |
| 1,879,650 | Wollensak | Sept. 27, 1932 |
| 1,885,989 | Charlin | Nov. 1, 1932 |
| 1,886,540 | Grant | Nov. 8, 1932 |
| 2,043,871 | Whitman | June 9, 1936 |
| 2,111,806 | Ross | Mar. 22, 1938 |
| 2,234,697 | Hickman | Mar. 11, 1941 |
| 2,285,975 | Hubschmid | June 9, 1942 |